US012085870B2

(12) United States Patent
Ozeki et al.

(10) Patent No.: US 12,085,870 B2
(45) Date of Patent: Sep. 10, 2024

(54) IMAGE FORMATION APPARATUS

(71) Applicant: Oki Electric Industry Co., Ltd., Tokyo (JP)

(72) Inventors: Fumitaka Ozeki, Tokyo (JP); Hisashi Soga, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 18/313,667

(22) Filed: May 8, 2023

(65) Prior Publication Data

US 2023/0375957 A1 Nov. 23, 2023

(30) Foreign Application Priority Data

May 18, 2022 (JP) ................................ 2022-081485

(51) Int. Cl.
*G03G 15/08* (2006.01)

(52) U.S. Cl.
CPC ..... *G03G 15/0844* (2013.01); *G03G 15/0887* (2013.01)

(58) Field of Classification Search
CPC ........... G03G 15/0844; G03G 15/0887; G03G 15/556
See application file for complete search history.

(56) References Cited

U.S. PATENT DOCUMENTS

2008/0240764 A1 * 10/2008 Yamane ................. G03G 15/50 399/71
2013/0034365 A1 * 2/2013 Nakade .............. G03G 21/0005 399/72
2014/0241739 A1 * 8/2014 Takeuchi ........... G03G 15/0844 399/27
2017/0068198 A1 * 3/2017 Akita ..................... G03G 21/00

FOREIGN PATENT DOCUMENTS

JP 2004-45481 A 2/2004

* cited by examiner

*Primary Examiner* — Carla J Therrien
(74) *Attorney, Agent, or Firm* — METROLEX IP LAW GROUP, PLLC

(57) ABSTRACT

An image formation apparatus according to an embodiment may include: an image formation section to form an image with a developer; an entire area printing rate calculator configured to calculate an entire area printing rate, which is, a printing rate of an entirety of an image formation area; a divided area printing rate calculator configured to calculate each divided area printing rate, which is, a printing rate of each of plural divided areas, divided in a main scanning direction, of the image formation area; and a deteriorated developer discarding operation execution section configured, when the entire area printing rate is equal to or lower than an entire area printing rate threshold, to perform a deteriorated developer discarding operation to discard the developer in any one of the divided areas in which the divided area printing rate is equal to or lower than a divided area printing rate threshold thereof.

13 Claims, 5 Drawing Sheets

| A | B1 | B2 | B3 | B4 | B5 | B6 |
|---|---|---|---|---|---|---|
| 1.5 | 2 | 1.5 | 1 | 1 | 1.5 | 2 |

IMAGE FORMATION APPARATUS

CROSS REFERENCE TO RELATED APPLICATIONS

This application claims priority based on 35 USC 119 from prior Japanese Patent Application No. 2022-081485 filed on May 18, 2022, entitled "IMAGE FORMATION APPARATUS", the entire contents of which are incorporated herein by reference.

BACKGROUND

The disclosure may relate to an image formation apparatus configured to transfer a developer image to a recording medium to form an image on the recording medium.

In a related art, when an electrophotographic image formation apparatus repeats printing using toner with a lower density of toner consumed in a print image, some toner in a development device in an image formation unit may be in contact, for a long time, with a member charged with a high voltage and thus the toner may be deteriorated in the development device. Such deteriorated toner may cause deterioration of the image quality. Therefore, there has been proposed an image formation apparatus that is configured to discard such a deteriorated toner by ejecting the deteriorated toner from a development device onto a photosensitive drum and then collecting the deteriorated toner from the photosensitive drum into a waste toner collection container in an image formation unit (see, for example, Patent Document 1: Japanese Patent Application Publication No. 2004-45481).

In a case where the printing rate of the print data is high, the toner is developed (used) before the toner deteriorates and thus the deteriorated toner would be less likely to occur. Therefore, in order to prevent the deteriorated toner from being accumulated, the image formation apparatus is configured to discard the deteriorated toner based on the printing rate of the print data, that is, based on the amount of the toner consumed in the printing. That is, the image formation apparatus is configured to discard the deteriorated toner when the print pattern with a low printing rate and a low toner consumption continues.

Patent Document 1: Japanese Patent Application Publication No. 2004-45481

SUMMARY

However, when executing plural times printing in which the printing rate of the entire page is low but the printing rate in a partial area of the entire page in the main scanning direction is high, the image formation apparatus discards the toner in the entire area including the toner in the partial area in which the printing rate is high in vain since the printing rate of the entire page is low (the amount of the toner consumed for the entire page is low), although, in the partial area, the toner is consumed with the high printing rate and thus an amount of deteriorated toner is not large, which means that there is no need to discard the toner in the partial area.

An object of an embodiment of the disclosure may be to propose an image formation apparatus capable of maintaining a quality of a print image while suppressing excessive discard of developer.

An aspect of the disclosure may be an image formation apparatus that may include: an image formation section configured to form an image with a developer; entire area printing rate calculator configured to calculate an entire area printing rate, which is, a printing rate of an entirety of an image formation area; a divided area printing rate calculator configured to calculate each divided area printing rate, which is, a printing rate of each of plural divided areas into which the image formation area is divided in a main scanning direction; and a deteriorated developer discarding operation execution section configured, when the entire area printing rate is equal to or lower than an entire area printing rate threshold, to perform a deteriorated developer discarding operation to discard a developer in any one of the divided areas in which the divided area printing rate is equal to or lower than a divided area printing rate threshold thereof.

According to the aspect described above, the image formation apparatus can suppress discarding excessively the developer by not executing the deteriorated developer discarding operation in the divided area where the print rate is high, which indicates that an amount of the deteriorated developer is not large and thus the deteriorated developer discarding operation may not be required, while maintaining the quality of the print image by executing the deteriorated developer discarding operation in the divided area where the print rate is low, which indicates that the deteriorated developer is generated and thus the deteriorated developer discarding operation may be needed.

Therefore, according to the aspect described above, it may be possible to realize an image formation apparatus that is capable of suppressing excessive discard of developer while maintaining a quality of a print image.

DETAILED DESCRIPTION

Figure 1:
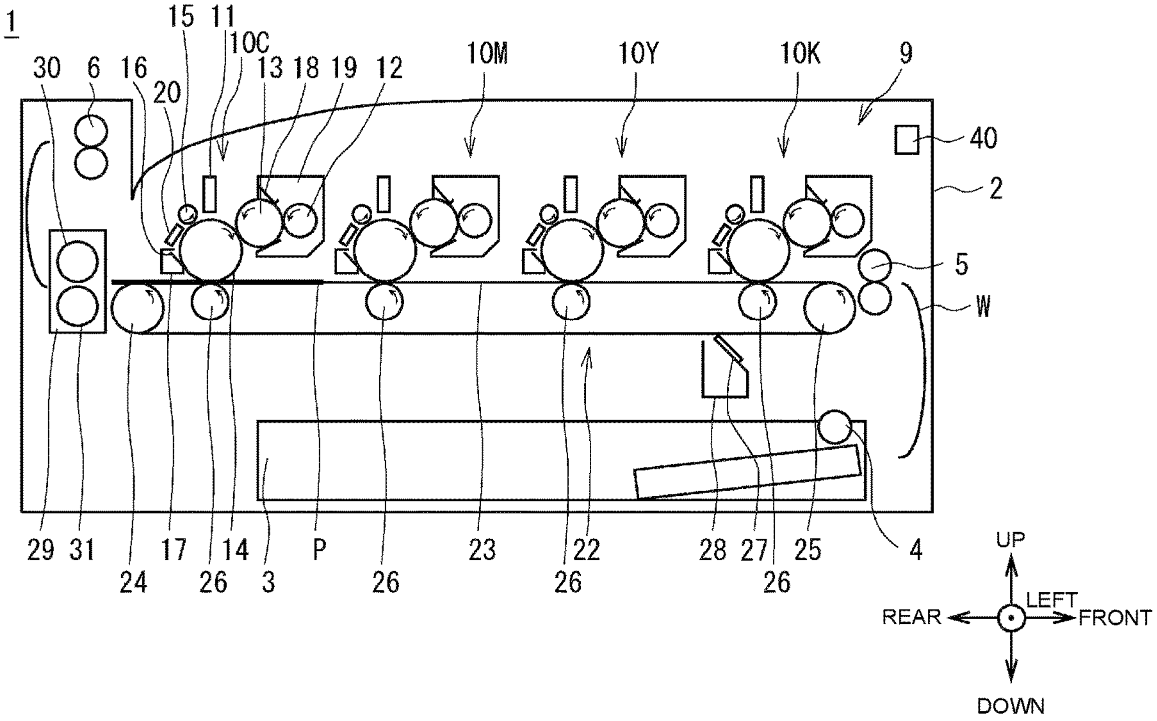
FIG. 1 is a diagram illustrating a left side view of an overall configuration of an image formation apparatus.

Descriptions are provided hereinbelow for one or more embodiments based on the drawings. In the respective drawings referenced herein, the same constituents are designated by the same reference numerals and duplicate explanation concerning the same constituents is omitted. All of the drawings are provided to illustrate the respective examples only.

1-1. Overall Configuration of Image Formation Apparatus

As illustrated in FIG. 1, an image formation apparatus 1 is a color electrophotographic printer, and prints a desired color image on paper P, which is a sheet medium. The image formation apparatus 1 includes various parts arranged inside a housing 2 (an apparatus housing) formed in a box-like shape. In the following description, the right end of the image formation apparatus 1 as seen in FIG. 1 is referred to as the front of the image formation apparatus 1, and the vertical, horizontal, and front-rear directions are defined as seen facing the front. An overall of the image formation apparatus 1 is controlled by a controller 40. The image formation apparatus 1 is connected wirelessly or by wire to an external device (not illustrated) such as a computer device or the like. Upon receipt of a print job representing an image to be printed and an instruction to print the print job from the external device, the controller 40 performs a printing process to form a print image on a surface of the paper sheet P.

A paper feed cassette 3 in which the paper sheets P are to be stored is provided at a lowest end portion of the housing 2. A hopping roller 4 is provided on an upper front side of the paper feed cassette 3. The hopping roller 4 has a lower part thereof in contact with the upper surface of the paper P stored in the paper feed cassette 3, and is configured, when rotated, to feed the uppermost sheet of the stored paper P forward.

A conveyance path W in which the paper P is to be conveyed is formed in the housing 2. Resist rollers 5 are provided downstream of the hopping roller 4 in the housing 2 in a paper conveyance direction in which the paper P is conveyed. The resist rollers 5 are composed of a plurality of rollers facing each other with the conveyance path W therebetween and in contact with each other, and are configured to convey the paper P on the transport path W while correcting skew of the paper P. Furthermore, discharge rollers 6 are provided downstream of a fixation unit 29 in the housing 2 in the paper conveyance direction. The discharge rollers 6 are composed of a plurality of rollers facing each other with the conveyance path W therebetween and in contact with each other, and are configured to discharge the paper P from the conveyance path W to the outside of the image formation apparatus 1.

In the housing 2, an image formation section 9 is provided which is configured to form a print image by printing a color image, which is an image to be printed, on the surface of the paper sheet P. The image formation section 9 includes four image formation units 10 (image formation units 10K, 10Y, 10M and 10C) that are arranged in order from the front side (upstream side) to the rear side (downstream side) in an upper end portion of the housing 2. The image formation units 10 (10K, 10Y, 10M, and 10C) are respectively configured to develop electrostatic latent images for black (K), yellow (Y), magenta (M), and cyan (C) images, which are different color components of a print image, using black (K), yellow (Y), magenta (M), and cyan (C) toners as developers to form toner images corresponding to the print data.

The image formation units 10K, 10Y, 10M, and 10C have the same configuration except for the color of the toner used for developing the electrostatic latent images. Therefore, the image formation units 10K, 10Y, 10M, and 10C are referred to as the image formation units 10 for explanation below. Each image formation unit 10 includes a print head 11, a development device 19, a photosensitive drum 14, a charging roller 15, a cleaning blade 16, a drum waste toner collection container 17, and a neutralization part 20 (a static elimination part).

The development device 19 is a device configured to develop the toner image on the electrostatic latent image formed on the photosensitive drum 14, and includes a supply roller 12, a development roller 13 and a regulation blade 18.

The print head 11 is an LED (light emitting diode) head including a plurality of LED elements aligned along the left-right direction above the photosensitive drum 14 and arranged at positions where the lights emitted from the LED elements form images on the surface of an upper side portion of the photosensitive drum 14 respectively. The print head 11 is configured to turn on and off the respective LED elements based on the control of the controller 40. The print head 11 selectively exposes the uniformly charged surface of the photosensitive drum 14 with lights to form an electrostatic latent image.

The supply roller 12 is arranged in contact with the development roller 13, and is configured to supply the toner stored in a toner cartridge (not illustrated) to the development roller 13. The charging roller 15 uniformly charges the surface of the photosensitive drum 14 to a negative voltage. The development roller 13 is arranged in contact with the surface of the photosensitive drum 14, and is configured to charge the toner to cause the charged toner to be electrostatically adhered to the electrostatic latent image formed on the photosensitive drum 14 so as to form the toner image having a constant layer thickness. The photosensitive drum 14 as an image carrier is configured to carry the electrostatic latent image and also carry the toner image which is formed by developing the electrostatic latent image with the toner.

The regulation blade 18 is a plate-like member having a distal end portion thereof pressed against the development roller 13, and is configured to uniformly form a toner layer on the development roller 13.

The cleaning blade 16 is a blade made of urethane rubber, and is in contact with the photosensitive drum 14 at a position downstream, in the rotational direction of the photosensitive drum 14, of a contact position between a transfer roller 26 (described later) and the photosensitive drum 14, thereby removing the toner remaining on the surface of the photosensitive drum 14 after the transfer. The drum waste toner collection container 17 is a container for collecting and storing therein residual toner and waste toner remaining on the photosensitive drum 14 during the printing operation and a deteriorated toner discarding operation described later.

The neutralization part 20 includes a plurality of LED elements aligned in the left-right direction, is arranged so as to face the photosensitive drum 14, and is configured to turn on and off the LED elements based on the control of the controller 40. The neutralization part 20 exposes the surface of the photosensitive drum 14 with lights to reset the surface potential of the photosensitive drum 14.

Further, in the image formation section 9, a transfer unit 22 is provided below an area from the image formation unit 10K to the image formation unit 10C. The transfer unit 22 is configured to transfer the toner images formed by the image formation units 10K, 10Y, 10M and 10C to the surface of the paper P. The transfer unit 22 includes a transfer belt 23, a drive roller 24, an idle roller 25, transfer rollers 26, a belt cleaning blade 27 and a belt waste toner collection container 28.

The transfer belt 23 is an endless belt stretched between the drive roller 24 provided on the rear side and the idle roller 25 provided on the front side and is rotated to convey the paper sheet P on the upper surface of the transfer belt toward the rear side. The drive roller 24 is rotated to drive the transfer belt 23. The idle roller 25 is rotated by the rotation of the transfer belt 23 and stabilizes the driving of the transfer belt 23. Four transfer rollers 26 are rotatably provided inside the transfer belt 23 such that the four transfer rollers 26 are respectively opposed to the four photosensitive drums 14 of the image formation units 10. A transfer voltage, which is a positive voltage, is applied to the transfer rollers 26. As a result, in the operation of forming the print image, the transfer unit 22 transfers the toner images on the surfaces of the four photosensitive drums 14 to the surface of the paper sheet P by applying the transfer voltage to the transfer rollers 26 while sequentially passing the paper sheet P by the transfer belt 23 between the upper surfaces of the transfer rollers 26 and the lower surfaces of the photosensitive drums 14.

The belt cleaning blade 27 is a blade formed of, for example, a urethane rubber. The belt cleaning blade 27 is in contact with the transfer belt 23 and thus scrapes and removes the waste toner conveyed by the transfer belt 23 in the deteriorated toner discarding operation. The belt waste toner collection container 28 is a container for collecting and storing the waste toner removed from the transfer belt 23 by the belt cleaning blade 27.

With such a configuration, the image formation unit 10 supplies the toner from the toner cartridge to the development device 19. Then, the image formation unit 10 uniformly charges the surface of the photosensitive drum 14 with the charging roller 15 while rotating the photosensitive drum 14, and exposes the surface of the photosensitive drum 14 with the print head 11 based on the print data, so as to form the electrostatic latent image on the surface of the photosensitive drum 14. Then, the image formation unit 10 applies a developing voltage to the development roller 13 to electrostatically adhere the toner supplied by the supply roller 12 onto the electrostatic latent image formed on the photosensitive drum 14, so as to form the toner image. Further, the image formation unit 10 sandwiches the paper P being conveyed by the transfer belt 23 between the transfer roller 26 and the photosensitive drum 14 and transfers the toner image from the surface of the photosensitive drum 14 to the surface of the paper P. In this manner, the transfer unit 22 transfers the toner images of the four colors from the four photosensitive drums 14 onto the surface of the paper P and conveys the paper P having the toner images transferred thereon toward the fixation unit 29.

In the image formation section 9, the fixation unit 29 is arranged on the rear side of the transfer unit 22. The fixation unit 29 is configured to fix the toner images onto the surface of the paper P and includes, at a substantially central portion thereof in the vertical direction, a paper path through which the paper P is to be passed. The fixation unit 29 also includes a heating roller 30 rotatably provided above the paper path and a pressure roller 31 rotatably provided below the paper path. With this configuration, in the print image formation operation, the fixation unit 29 takes the paper P having the toner images transferred thereon from the transfer unit 22 into the paper path of the fixation unit 29, and sandwiches the paper P between the heating roller 30 and the pressure roller 31 which are rotating in directions opposite to each other. Then, the fixation unit 29 fixes the toner images on the surface of the paper P by heating and pressurizing the paper P between the heating roller 30 and the pressure roller 31 which are rotating in the directions opposite to each other. That is, the fixation unit 29 fixes the toner images of the four colors on the surface of the paper P so as to form the print image on the paper P, and conveys the paper P having the print image formed thereon to the discharge rollers 6 provided on the upper side of the fixation unit 29.

With such a configuration, the image formation apparatus 1 conveys the paper sheet P stored in the paper feed cassette 3 to the image formation section 9 by the resist rollers 5. The image formation section 9 transfers the toner images onto the paper sheet P by the image formation units 10 while conveying the paper sheet P by the transfer belt 23. The paper sheet P on which the toner images are transferred is conveyed to the fixation unit 29 by the transfer belt 23. The fixation unit 29 fixes the toner images transferred on the paper sheet P to the paper sheet P at a high temperature when the paper sheet P passes therethrough, so as to form the color image on the paper sheet P. The paper P having the color image thereon is conveyed and discharged to the outside of the image formation apparatus 1 by the discharge rollers 6.

Figure 3:
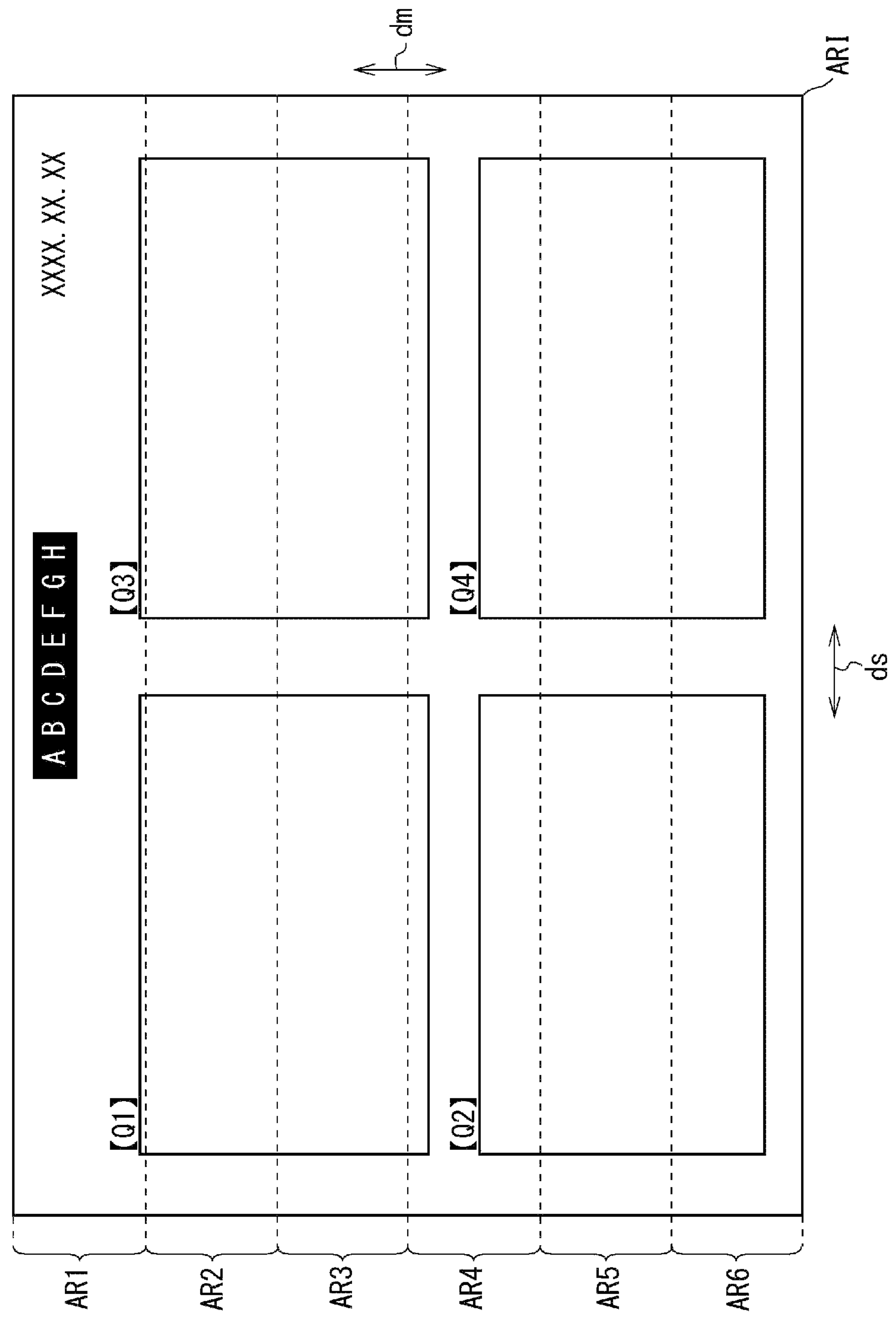
FIG. 3 is a diagram illustrating a view of an image formation area.

By the way, as illustrated in FIG. 3, in the image formation apparatus 1, an image formation area ARI, which is an area in which an image for one page can be formed in the print result, is set to a predetermined range in the main scanning direction dm (the left-right direction) orthogonal to the paper conveyance direction and in the sub-scanning direction ds (the front-rear direction) orthogonal to the main scanning direction dm. The range of the image formation area ARI in the main scanning direction dm corresponds to the range from the rightmost LED element to the leftmost LED element of the print head 11 (hereinafter may be referred to as an entire area). Further, when the image formation area ARI is divided into, for example, six areas at equal intervals in the main scanning direction dm, the divided areas are respectively referred to as areas AR1, AR2, AR3, AR4, AR5 and AR6 (hereinafter may be referred to as areas AR or divided areas AR).

2. Control Configuration of Image Formation Apparatus

Figure 2:
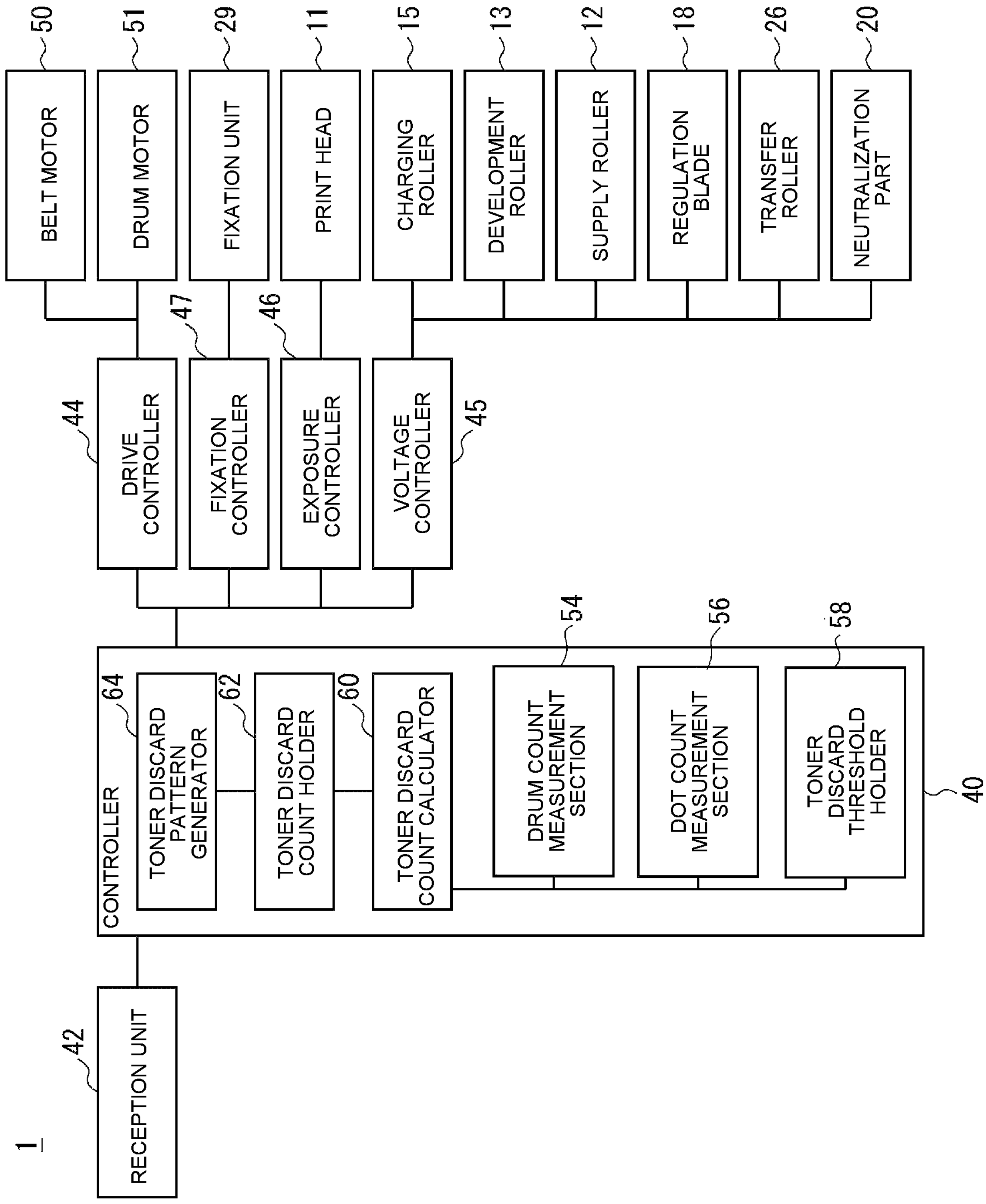
FIG. 2 is a block diagram illustrating a control configuration of the image formation apparatus.

As illustrated in FIG. 2, the image formation apparatus 1 includes the controller 40, a reception unit 42, a drive controller 44, a voltage controller 45, an exposure controller 46, a fixation controller 47, a belt motor 50, a drum motor 51, the charging roller 15, the development roller 13, the supply roller 12, the regulation blade 18, the transfer rollers 26, the neutralization part 20, the print head 11, and the fixation unit 29. The controller 40 controls the entirety of the image formation apparatus 1. Upon receiving a print instruction from an external device (not illustrated), the reception unit 42 sends the print instruction to the controller 40.

The controller 40 is configured mainly with a central processing unit or a CPU (not illustrated), and performs various kinds of processing by reading and executing programs from a storage (not illustrated) such as a memory or the like. The controller 40 includes a drum count measurement section 54, a dot count measurement section 56, a toner discard threshold holder 58 (a toner discard threshold storage section 58), a toner discard count calculator 60, a toner discard count holder 62 (a toner discard count storage section 62)and a toner discard pattern generator 64.

The toner discard threshold holder 58 stores toner discard thresholds (described later) in advance. The drum count measurement section 54 measures a drum count. The drum count indicates a count corresponding to the number of rotations of the photosensitive drum 14. For example, the number of rotations of the drum in a printing operation in which three sheets of A4 paper are printed is measured as the drum count of three.

The dot count measurement section 56 measures a dot count. Specifically, the dot count measurement section 56 measures the dot count of each divided area AR (FIG. 3). The dot count measurement section 56 uses the sum of the dot counts of the divided areas AR1, AR2, AR3, AR4, AR5 and AR6 as a dot count for the entire area. The dot count indicates the count based on the number of light-emitting dots of the print head 11, and is a value obtained by dividing the number of light-emitting dots by 8192. For example, the dot count measurement section 56 counts the dot count of 792 when printing with the image density (printing rate) of 5% on an A4 paper. That is, when printing with the print duty of 5% on the A4 paper, the dot count measurement section 56 counts the dot count of 792 (6488064 dots/8192).

6488064 is the actual number of dots emitted when printing with the print duty of 5% on the A4 paper. 8192 is the 13th power of 2. In other words, the dot count measurement section 56 calculates (measures) the dot count value, which is reduced from the number of the actually-emitted dots, by dividing the number of the actually-emitted dots by the 13th power of 2 (819291).

Here, the printing rate for one page of the paper sheet P is a ratio of an area of an image actually formed on the paper P to an area of a solid image formed on the image forming area ARI. The printing rate for one print job is an average value of the printing rates of all pages included in the one print job. In other words, assuming that dots are formed over (filled in) the entirety of the predetermined area on the surface of the paper P (on one page of the paper P), the print rate for the one page is 100%. The printing rate for one page is the ratio of the numbers of the dots actually printed in the predetermined area on the one page of the paper relative to the numbers of the dots assumingly printed over (filled in) the entirety of the predetermined area on the one page of the paper. Therefore, the printing rate, in a divided area AR, of one print job is the average value of the printing rates, in the divided area AR, of all the pages included in the one print job.

The toner discard count calculator 60 calculates a toner discard count based on the drum count measured by the drum count measurement section 54, the dot count measured by the dot count measurement section 56, and the toner discard thresholds held by the toner discard threshold holder 58, and sent the calculated toner discard count to the toner discard count holder 62. The toner discard count holder 62 holds the calculated toner discard count. The toner discard pattern generator 64 creates a toner discard pattern.

In such a configuration, upon receiving a print instruction from the reception unit 42, the controller 40 refers to the toner discard count held in the toner discard count holder 62, and checks whether or not there is any one of the divided areas AR in which an operation of discarding deteriorated toner should be done. If it is determined that there is any one of the divided areas AR in which the deteriorated toner discarding operation should be done, the controller 40 causes the toner discard pattern generator 64 to create a toner discard pattern. The controller 40 issues an instruction of a printing operation by sending the generated toner discard pattern and the print information from the external device, to the drive controller 44, the voltage controller 45, the exposure controller 46, and the fixation controller 47. On the other hand, if there is no area AR in which the deteriorated toner discarding operation should be done, the controller 40 does not execute the deteriorated toner discarding operation, and issues an instruction of a printing operation by sending the print information received from the external device to the drive controller 44, the voltage controller 45, the exposure controller. 46, and the fixation controller 47.

The drive controller 44 is configured, upon receiving an instruction from the controller 40, to control the drum motor 51 and the belt motor 50 to rotate, thereby rotating the photosensitive drum 14 and the drive roller 24 in the directions of the arrows illustrated in FIG. 1. The voltage controller 45 is configured, upon receiving an instruction from the controller 40, to control the voltages applied to the charging roller 15, the development roller 13, the supply roller 12, the regulation blade 18, the transfer roller 26, and the neutralization part 20. The exposure controller 46 configured, upon receiving an instruction from the controller 40, to control the print head 11 to emit lights. The fixation controller 47 is configured, upon receiving an instruction from the controller 40, to control the temperature of the fixation unit 29. The drum count measurement section 54 and the dot count measurement section 56 are configured to measure the drum count and the dot count, respectively, in the deteriorated toner discarding operation and the printing operation.

3. Printing Operation

Next, a printing operation is described. The image formation apparatus 1 applies a charging voltage to the charging roller 15 by the voltage controller 45 to uniformly charge the surface of the photosensitive drum 14, and then causes the print head 11 to emit lights by the exposure controller 46 as to form an electrostatic latent image on the surface of the photosensitive drum 14.

The image formation apparatus 1 applies a developing voltage from the voltage controller 45 to the development roller 13 having a thin toner layer formed thereon, so as to develop the electrostatic latent image on the photosensitive drum 14 with the toner. Note that in order to uniformly form the thin toner layer on the development roller 13 and set the charge amount of the toner in the toner thin layer to a predetermined value, a supply voltage and a regulation blade voltage are respectively applied to the supply roller 12 and the regulation blade 18 by the voltage controller 45.

Next, the image formation apparatus 1 applies a transfer voltage to the transfer rollers 26 by the voltage controller 45, transfers the toner images from the photosensitive drums 14 onto the paper P, and then fixes the toner images onto the paper P by the fixation unit 29 to obtain the printed paper P. The printed paper P is discharged to the outside of the image formation apparatus 1 by the discharge rollers 6. Accordingly, the image formation apparatus 1 completes the printing operation. The toner remaining on the photosensitive drum 14 without being transferred is removed by the cleaning blade 16. Further, the surface potential of the photosensitive drum 14 is reset by exposure by the neutralization part 20.

When the image formation apparatus 1 is operated in a normal temperature and humidity environment using a negatively chargeable toner (a negatively electrifiable toner), the applied voltage settings are set to, for example, −1050 V for the charging voltage, −200 V for the developing voltage, and −300 V for the supply voltage, and −300 V for the regulation blade voltage. When the charging voltage having a predetermined value or more is applied to the charging roller 15, the surface of the photosensitive drum 14 is charged, and the surface potential changes in proportion to the charging voltage. In an embodiment, when the charging voltage of −1050 V is applied, the surface potential of the photosensitive drum 14 becomes −500 V. The potential of the electrostatic latent image formed by light emission from the print head 11 becomes −50 V, and the toner is reversely developed from the development roller 13 onto the electrostatic latent image. In a case of a positively chargeable toner (a positively electrifiable toner), the positive and negative sign of each of the voltages is reversed.

By the way, in the image formation apparatus 1, the toner consumption amount of all the development devices 19 may become excessively small, or the toner consumption amount of one of the development devices 19 may become excessively small due to selection of a specific color upon forming a color image. When the toner consumption decreases, the toner continues to be stirred in the development device 19, and the toner that is adhered on the development roller 13 continues to be rubbed by the supply roller 12, the regulation blade 18, and the photosensitive drum 14. In this case, the toner on the development roller 13 is triboelectrically charged and the potential of the toner tends to become high. In a case where the potential of the toner on the development roller 13 becomes too high, it may cause a smudge in the image. In addition, if the toner is rubbed continuously, the toner may be damaged, and the external additive attached to the toner may be detached from the surface of the toner. In this case, the image formation apparatus 1 cannot properly charge the toner, which may cause stains, fogging, blurring, and deterioration of graininess.

As described above, when the toner consumption becomes excessively small, the image formation apparatus 1 cannot properly charge the toner, which may cause stains, fogging, blurring, deterioration of graininess, and the like, so as to degrade the image quality. Therefore, in order to maintain the image quality, the image formation apparatus 1 executes, when printing with a small amount of toner consumption is repeated or the like, an operation of discarding the toner by a predetermined amount, which is referred to as an operation of discarding of deteriorated toner or a deteriorated toner discarding operation.

4. Deteriorated Toner Discarding Operation

Next, the deteriorated toner discarding operation is described. The image formation apparatus 1 executes a deteriorated toner discarding operation in a preparatory operation before a printing operation performed after receiving a print instruction. The image formation apparatus 1 executes a deteriorated toner discarding operation by causing the print head 11 to emit lights on the photosensitive drum 14 uniformly charged by the charging roller 15 to form the electrostatic latent image on the surface of the photosensitive drum 14, and developing the electrostatic latent image on the surface of the photosensitive drum 14 with the toner by the development roller 13, so as to discard deteriorated toner from the development device 19. When one deteriorated toner discarding operation is performed for the entire area, the amount of toner discarded in the one deteriorated toner discarding operation is the amount of toner corresponding to the printing rate of 5% over the entire area (that is, all the divided areas), which corresponds to one count in the toner discard count (described in detail later) of all the divided areas. Also, when one deteriorated toner discarding operation is performed for one of the divided areas AR, the amount of toner discarded in the one divided area AR is the amount of toner corresponding to the printing rate of 5% in the one divided area AR, which corresponds to one count in the toner discard count (described in detail later) of the one divided area AR.

In a case where a print pattern with the toner consumption amount of the entire area (FIG. 3) being small is used, an image formation apparatus according a comparative example discards the toner uniformly over the entire area in the main scanning direction dm. However, as far as the divided area AR1 in FIG. 3 is concerned, the divided area AR1 consumes more toner than the predetermined toner consumption amount, and thus the image quality in the divided area AR1 does not deteriorate even if the deteriorated toner discarding operation is not performed. Considering this point, the image formation apparatus 1 according to an embodiment is configured to determine, based on the amount of toner consumed in each divided area AR in addition to the amount of toner consumed in the entire area in the main scanning direction dm, whether to perform the deteriorated toner discarding operation, to thereby prevent from discarding the toner more than necessary.

5. Calculation Method of Toner Discard Count

A method of calculating the toner discard count is described below. Numbers 1 to 6 are represented by "x" in the following equations, and correspond to the divided areas AR1 to AR6, respectively. An entire area toner discard count K (the toner discard count for the entire area) and a divided area toner discard count Lx (the toner discard count for each divided area AR) are calculated by the following equations, where the drum count per printing operation is referred to as a drum count Dr, the dot count in the divided area AR per printing operation is referred to as a divided area dot count Dtx, and a toner discard count conversion coefficient for the entire area is referred to as an entire area toner discard count conversion coefficient Y (in an embodiment, 792), a toner discard threshold for the entire area is referred to as an entire area toner discard threshold A, and a toner discard threshold for the divided area AR is referred to as a divided area toner discard threshold Bx. Note that in the following description, the dot counts Dt1 to Dt6 for the divided areas may be referred to as divided area dot counts Dt, the toner discard thresholds B1 to B6 for the divided areas may be referred to as divided area toner discard thresholds B, and the toner discard counts L1 to L6 for the divided areas may be referred to as divided area toner discard counts L.

$$K=K+(A*Dr-\Sigma Dtx)/Y \quad (1)$$

$$Lx=Lx+((Bx/6)*Dr-Dtx)/(Y/6) \quad (2)$$

By using a value six times the image density calculated from the dot count consumed in the divided area in an actual printing operation for determination based on the divided area toner discard threshold Bx, the entire area toner discard threshold A and the divided area toner discard threshold Bx are the same value when the toner discard amount in the divided area AR is equal to ⅙ of the toner discard amount in the entire area.

Figures 4, 5:
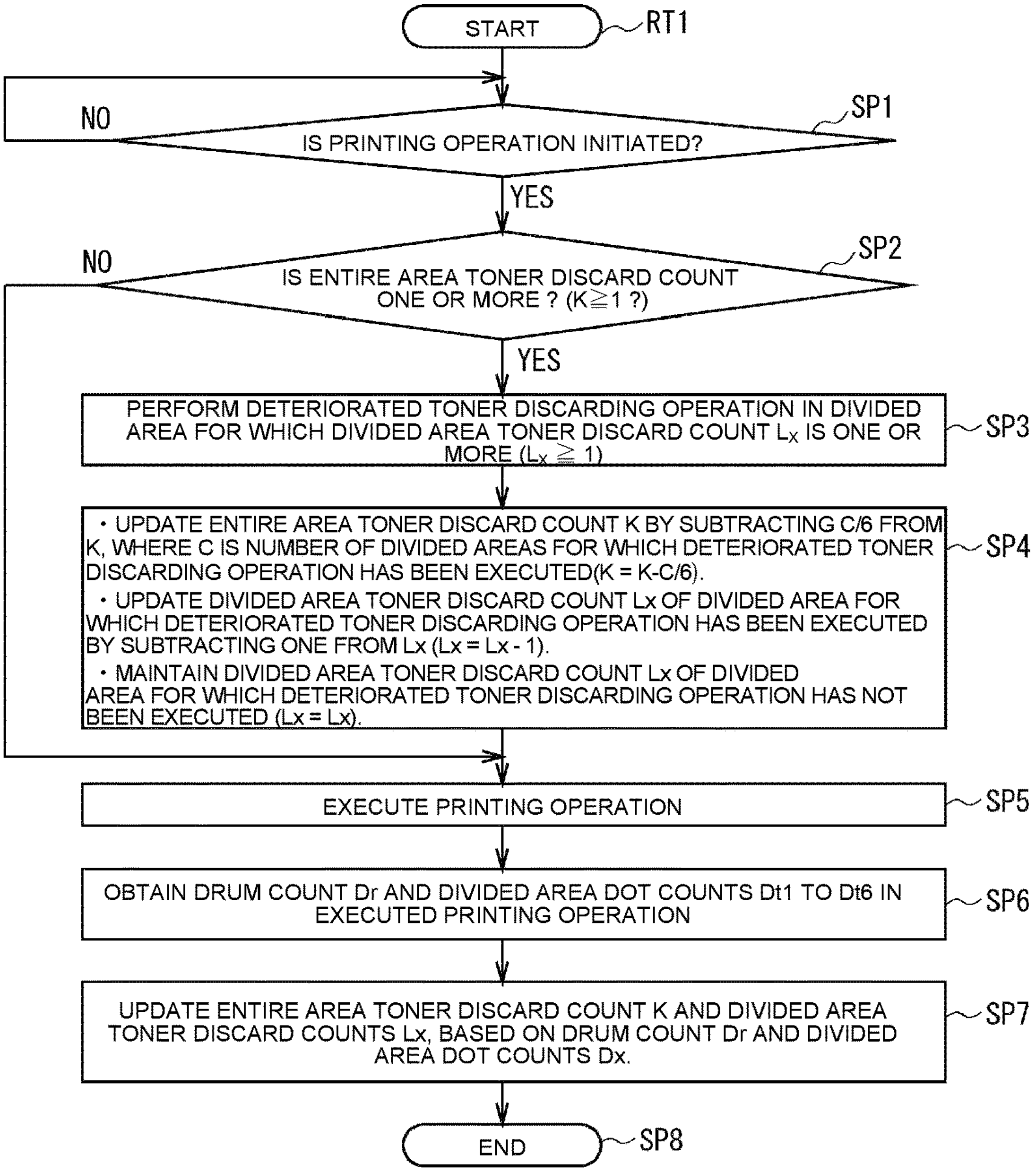
FIG. 4 is a table illustrating toner discard thresholds.
FIG. 5 is a flowchart illustrating print processing procedures.

Also, as illustrated in FIG. 4, the divided area toner discard thresholds B1 and B6 are set to the image density (printing rate) of 2%, and the divided area toner discard thresholds B2 and B5 are set to the image density (printing rate) of 1.5%, and the divided area toner discard thresholds B3 and B4 are set to the image density (printing rate) of 1%. Furthermore, the entire area toner discard threshold A is set to the image density (printing rate) of 1.5%.

As indicated in equation (2), the greater the value of the divided area toner discard threshold Bx, the more easily the divided area toner discard count Lx increases. Also, as the divided area toner discard threshold Bx increases, the toner disposal count tends to increase even if the dot count remains the same, although the toner discard amount in one deteriorated toner discarding operation does not change. Thus, the greater the value of the divided area toner discard threshold Bx, the more frequently the deteriorated toner discarding operation is executed.

The image formation apparatus 1 according to an embodiment has a structure in which the deteriorated toner is more likely to accumulate at the end portions in the main scanning direction dm of the development device 19 than at the center portion in the main scanning direction dm of the development device 19, due to the characteristics of the toner circulation in the development device 19 in the main scanning direction dm, which differ depending on the design of the development device 19.

On the other hand, as illustrated in FIG. 4, the image formation apparatus 1 is configured such that the divided area toner discard thresholds B3 and B4 of the divided areas AR3 and AR4, which are located at the center portion in the main scanning direction dm, are set to 1%, the divided area toner discard thresholds B2 and B5 of the divided areas AR2 and AR5, which are adjacent to and located on the outer side of the divided areas AR3 and AR4 in the main scanning direction dm, are set to 1.5% higher than the divided area toner discard thresholds B3 and B4, and the divided area toner discard thresholds B1 and B6 of the divided areas AR1 and AR6, which are adjacent to and located on the outer side of the divided areas AR2 and AR5 in the main scanning direction dm (that is, located at the end portions in the main scanning direction dm), are set to 2%, which is even higher than the divided area toner discard thresholds B2 and B5.

In this manner, the divided area toner discard thresholds B is set in the image formation apparatus 1 such that the value of the divided area toner discard threshold B is increased stepwise from the center of the image formation area toward the ends of the image formation area in the main scanning direction dm. Therefore, the image formation apparatus 1 is configured such that the toner discard counts in the divided areas AR closer to the ends in the main scanning direction dm are likely to be increased compared to the toner discard counts in the divided areas AR closer to the center in the main scanning direction dm, and thus the deteriorated toner is more frequently discarded in the divided areas AR closer to the ends in the main scanning direction dm than in the divided areas AR closer to the center in the main scanning direction dm. As a result, when the image formation apparatus 1 is operated, the image formation apparatus 1 can control the toner discard amounts such that more toner is discarded from the divided areas AR located closer to the center portion compared to the divided areas AR located at the end portions in the main scanning direction dm. Thus, the image formation apparatus 1 can more actively discharge the deteriorated toner at the end portions of the image formation area in the main scanning direction dm where the more deteriorated toner tends to be accumulated.

6. Printing Processes

Next, a specific processing procedure of print processing by the controller 40 is described in detail with reference to the flowchart illustrated in FIG. 5. When the power of the image formation apparatus 1 is turned on, the controller 40 reads out the print processing program from the storage and executes the print processing program thereby starting the print processing procedure RT1 to proceed to step SP1. In step SP1, the controller 40 waits until the reception unit 42 receives a print instruction from the outside, and, when the print instruction is received to thereby initiate the printing operation, proceeds to step SP2.

In step SP2, the controller 40 determines whether or not the entire area toner discard count K is 1 or more (that is, K≥1). If a positive result is obtained in step SP2, which means that the entire area toner discard count K is equal to or more than one (the entire area threshold), the amount of the deteriorated toner that is equal to or more than one count, which is the predetermined amount, is accumulated, indicating that it may be necessary to discard the deteriorated toner for any one of the divided areas AR that requires the deteriorated toner discarding operation. Thus, when a positive result is obtained in step SP2, the controller 40 proceeds to step SP3.

In step SP3, the controller 40 checks each of the divided area toner discard counts Lx (x is 1 to 6), and performs the deteriorated toner discarding operation to discard the deteriorated toner by the amount corresponding to the one count in any one of the divided areas AR for which the divided area toner discard count Lx is equal to or more than 1 as the divided area threshold (Lx≥1), and then proceeds to step SP4.

In step SP4, the controller 40 updates the entire area toner discard count K and each divided area toner discard count Lx, and proceeds to step SP5. Specifically, the controller 40 recalculates the entire area toner discard count K according to the following equation, where the number of divided areas AR for which the deteriorated toner discarding operation has been executed in step SP3 is referred to as the number C of the divided areas AR where the toner discarding operation is performed (the toner discarding execution area number C).

$$K=K-C/6 \tag{3}$$

Further, the controller 40 recalculates the divided area toner discard count Lx of each of any one of the divided areas AR for which the deteriorated toner discarding operation is performed in step SP3 (where “x” indicates which ones of the divided areas AR for which the deteriorated toner discarding operation is performed in step SP3) as follows:

$$Lx=Lx-1 \tag{4}$$

In this way, the controller 40 updates the divided area toner discard count L of each of any one of the divided areas AR for which the deteriorated toner discarding operation is performed, by subtracting one, which corresponds to one count used in the deteriorated toner discarding operation this time, from the corresponding divided area toner discard count L.

Further, the controller 40 recalculates the divided area toner discard count Lx of each of any one of the divided areas AR for which the deteriorated toner discarding operation is not performed in step SP3 (where “x” indicates which ones of the divided areas AR for which the deteriorated toner discarding operation is not performed in step SP3) as follows:

$$Lx=Lx \tag{5}$$

On the other hand, if a negative result is obtained in step SP2, which means that the entire area toner discard count K is less than 1, that is, the deteriorated toner is not accumulated up to the predetermined amount of 1 count, and thus there is no need to execute deteriorated toner discarding operation, the controller 40 skips steps SP3 and SP4 and proceeds to step SP5.

The controller 40 performs a printing operation in step SP5 and then proceeds to step SP6. In step SP6, the controller 40 causes the drum count measurement section 54 and the dot count measurement section 56 to obtain the drum count Dr and each of the divided area dot counts Dt1 to Dt6 in the printing operation executed at step SP5 and then proceeds to step SP7. In step SP7, the controller 40 causes the toner discard count calculator 60 to perform the calculations of the above-described equations (1) and (2) based on the drum count Dr and each of the divided area dot counts Dt1 to Dt6 obtained in step SP6, and updates the entire area toner discard count K and each of the divided area toner discard counts Lx, and then proceeds to step SP8 so as to end the print processing procedure RT1.

7. Functional Configuration of Image Formation Apparatus

Figure 6:
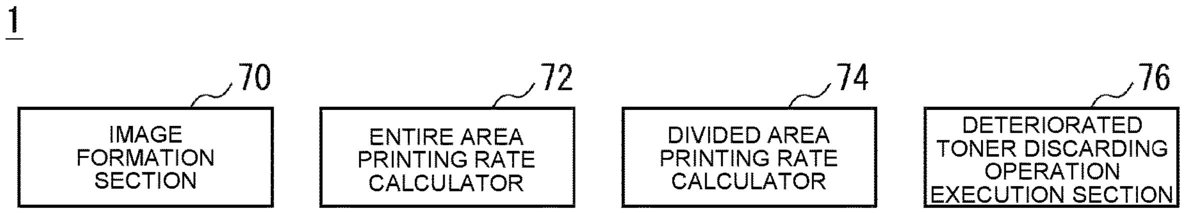
FIG. 6 is a block diagram illustrating a functional configuration of the image formation apparatus.

FIG. 6 is a functional block diagram illustrating basic functions related to print processing in the image formation apparatus 1.

An image formation section 70 corresponds to the image formation section 9 (FIG. 1), and forms the images using the toners serving as developers. An entire area printing rate calculator 72 corresponds to the controller 40 (FIG. 2), and calculates the printing rate of the entire area as the entire area printing rate, which is the printing rate of the entirety of the image formation area ARI. A divided area printing rate calculator 74 corresponds to the controller 40 (FIG. 2), and calculates the printing rate of each of the plural divided areas AR into which the image formation area is divided in the main scanning direction. A deteriorated toner discarding operation execution section 76 corresponds to the controller 40 (FIG. 2), and performs, when the entire area toner discard count K is 1 or more (that is, the printing rate of the entire area is equal to or less than the entire area printing rate threshold), the deteriorated toner discarding operation for any one of the divided areas AR in which the divided area toner discard count Lx (x is 1 to 6) is 1 or more (that is, the printing rate of the divided area AR is equal to or lower than the divided printing rate threshold).

8. Effects

In the above configuration, the image formation apparatus 1 is configured, only when the printing rate of the entire image formation area ARI is low and the printing rate of any one of the divided areas AR is low, to perform the deteriorated toner discarding operation in the divided area(s) AR. In other words, even if the printing rate of the entire image formation area ARI is low, if the printing rates of all the divided areas AR are high, the image formation apparatus 1 does not perform the deteriorated toner discarding operation in the divided areas AR. Furthermore, even if the printing rate of any one of the divided areas AR is low, if the printing rate of the entire image formation area ARI is high, the image formation apparatus 1 does not perform the deteriorated toner discarding operation in the divided area(s) AR.

Therefore, when the printing rate of the entire page is low and thus the toner consumption of the entire page is small, the image formation apparatus 1 performs the deteriorated toner discarding operation only in the divided area(s) AR where the printing rate is low and does not perform the deteriorated toner discarding operation in the divided area(s) AR where the printing rate is high. As a result, the image formation apparatus 1 can suppress discarding the toner excessively, by not executing the deteriorated toner discarding operation in the divided area(s) AR where the print rate is high, which indicates that a large amount of the deteriorated toner is not generated and thus the deteriorated toner discarding operation may not be required, while maintaining the quality of the print image by executing the deteriorated toner discarding operation in the divided area(s) AR where the print rate is low, which indicates that the deteriorated toner is generated and thus the deteriorated toner discarding operation may be required.

Further, the image formation apparatus 1 is configured such that the values of the divided area toner discard thresholds B for the divided areas are set to gradually (stepwise) increase from the divided area AR located at the center portion in the main scanning direction dm toward the divided area AR located at the end portion in the main scanning direction dm. With this configuration, the image formation apparatus 1 can perform the deteriorated toner discarding operation such that the amount of the toner to be discarded gradually increases from the divided area AR located at the center portion in the main scanning direction dm toward the divided area AR located at the end portion in the main scanning direction dm. As a result, when the image formation apparatus 1 is operated, the image formation apparatus 1 can discard the deteriorated toner such that the amount of the toner to be discarded increases from the divided area AR at the center portion in the main scanning direction dm toward the end portion in the main scanning direction dm, and thereby discharging the toner more actively at the end portion in the main scanning direction dm where the more deteriorated toner tends to be accumulated.

According to the above configuration, the image formation apparatus 1 includes: the image formation section 70 configured to form the image with the toner; the entire area printing rate calculator 72 configured to calculate the entire area printing rate, which is the printing rate of the entirety (the entire area) of the image formation area ARI; the divided area printing rate calculator 74 configured to calculate each divided area printing rate, which is the printing rate of each of the divided areas AR into which the image formation area ARI is divided in the main scanning direction dm; and the deteriorated toner discard execution section 76 configured to perform, when the entire area printing rate is equal to or lower than the entire area printing rate threshold, the deteriorated toner discarding operation in any one of the divided areas AR in which the divided area printing rate is equal to or lower than the divided area printing threshold thereof.

As a result, the image formation apparatus 1 can suppress discarding the toner excessively by not executing the deteriorated toner discarding operation in the divided area(s) AR where the print rate is high, which indicates that an amount of the deteriorated toner is not large and thus the deteriorated toner discarding operation may not be needed, while maintaining the quality of the print image by executing the deteriorated toner discarding operation in the divided area(s) AR where the print rate is low, which indicates that the deteriorated toner is generated and thus the deteriorated toner discarding operation may be needed.

9. Other Embodiments

In one or more embodiments described above, a case has been described in which the image formation apparatus 1 is configured such that the divided area toner discard thresholds B are set to increase stepwise from the divided area located at the center portion in the main scanning direction dm toward the divided area located at the end portion in the main scanning direction dm. However, the invention is not limited to thereto. For example, the image formation apparatus 1 may be configured such that at least the divided area toner discard threshold B for the divided area AR located at the end portion in the main scanning direction dm is set greater than the divided area toner discard threshold B for the divided area AR located at the center portion in the main scanning direction dm. or the image formation apparatus may be configured such that the divided area toner discard threshold B for a first divided area AR located closer to the end portion in the main scanning direction dm is set greater than the divided area toner discard threshold B for a second divided area AR located closer in the main scanning direction dm to the center portion than the first divided area AR. Further, for example, in a case where the image formation apparatus 1 has characteristics in which the deteriorated toner tends to be accumulated more at the center portion of the image formation area in the main scanning direction dm than at the end portion of the image formation area in the main scanning direction dm, the image formation apparatus 1 may be configured such that the divided area toner discard threshold B for the divided area AR located at the center portion in the main scanning direction dm is set greater than the divided area toner discard threshold B for the divided area AR located at the end portion in the main scanning direction dm. In short, the image formation apparatus 1 may be configured such that the divided area toner discard threshold B for the divided area AR in the main scanning direction dm where the deteriorated toner is likely to be accumulated is set to be greater than the divided area toner discard threshold B for the divided area AR in the main scanning direction dm where the deteriorated toner is less likely to be accumulated.

Further, in one or more embodiments described above, a case has been described in which the divided area toner discard thresholds B are set to increase in a stepwise manner from the center portion toward the end portion in the main scanning direction dm without changing the toner discard amount per deteriorated toner discarding operation, so as to facilitate the increase of the toner disposal count in the divided area located closer to the end portion in the main scanning direction dm than the divided area located closer to the center portion in the main scanning direction dm, thereby performing the deteriorated toner discarding operation more frequently at the divided area located closer to the end portion in the main scanning direction dm than at the divided area located closer to the center portion in the main scanning direction dm. However, the invention is not limited thereto. The image formation apparatus 1 may be configured such that the toner discard amount per deteriorated toner discarding operation is set to increase from the center portion toward the end portion in the main scanning direction dm.

Furthermore, in one or more embodiments described above, a case has been described in which the image formation apparatus 1 is configured such that the respective divided area toner discard thresholds B for all the image formation units 10 are the same. However, the invention is not limited thereto. For example, all the image formation units 10 in the image formation apparatus 1 do not have to have the same divided area toner discard threshold B. In such a case, since the toner stored in the image formation unit 10 that is arranged near the fixation unit 29 tends to deteriorate easily due to the heat generated by the fixation unit 29, the image formation apparatus may be configured such that the closer to the fixation unit 29 the image formation unit 10 is arranged among the image formation units 10, the larger the divided area toner discard threshold value B may be set to.

Furthermore, in one or more embodiments described above, a case has been described in which the image formation apparatus 1 is configured such that the image formation area ARI is divided into, for example, the six areas AR at the equal intervals in the main scanning direction dm. The invention is not limited to this. For example, the image formation apparatus 1 may be configured such that the image formation area ARI is divided into any number (e.g., 5 or less or 7 or more) of areas AR at equal intervals in the main scanning direction dm. Further, the image formation apparatus 1 does not have to divide the image formation area ARI into equal intervals in the main scanning direction dm.

Furthermore, in one or more embodiments described above, a case has been described in which the image formation apparatus 1 performs the deteriorated toner discarding operation at the same timing for all of the divided areas AR in which the divided area toner discard count Lx is equal to or greater than 1 in step SP3 of the print processing procedure RT1 (FIG. 5). However, the invention is not limited thereto. For example, the image formation apparatus 1 may not perform the deteriorated toner discarding operation at the same timing for all of the divided areas AR in which the divided area toner discard count Lx is equal to or greater than 1, that is, may perform the deteriorated toner discarding operation for at least one of the divided areas AR in which the divided area toner discard count Lx is equal to or greater than 1 at a timing different from the other divided areas AR.

Furthermore, in one or more embodiments described above, a case has been described in which the image formation apparatus 1 is configured to calculate the printing rate for each print job. However, the invention is not limited thereto. For example, the image formation apparatus 1 may be configured to calculate the printing rate for each print page.

Further, in one or more embodiments described above, a case has been described in which, when the image formation apparatus 1 receives a print instruction from the outside to thereby initiate the printing operation in step SP1 of the print processing procedure RT1 (FIG. 5), the image formation apparatus 1 executes the deteriorated toner discarding operation as necessary. However, the invention is not limited thereto. For example, the image formation apparatus 1 may execute the deteriorated toner discarding operation as necessary at any one or two or more of various timings, such as the time when the power of the image formation apparatus 1 is turned on, the time when the cover of the image formation apparatus 1 is opened and closed, the time when any one of various correction operations is performed, and the time when or after the printing operation is completed, or may execute the deteriorated toner discarding operation as necessary at plural timings selected among the various timings.

Further, in one or more embodiments described above, a case has been described in which the image formation apparatus 1 is configured to discard the toner by the amount corresponding to one count in the deteriorated toner discarding operation. However, the invention is not limited thereto. For example, the image formation apparatus 1 may be configured to discard the toner by an amount different from the amount corresponding to the one count in the deteriorated toner discarding operation.

Further, in one or more embodiments described above, a case has been described in which the invention is applied to the image formation apparatus 1. However, the invention is not limited thereto. For example, the invention may be applied to any one of various electronic devices that perform various image-related processes, such as a copier, and a facsimile device, an MFP (multi-function peripheral), and the like.

Furthermore, the invention is not limited to one or more embodiments and modifications described above. That is, the application range of the invention covers embodiments obtained by arbitrarily combining some of or all of one or more embodiments and modifications described above. The scope of the invention also extends to an embodiment in which a part of the configuration in any one of one or more embodiments and modifications described above that is extracted is replaced or diverted with a part of the configuration of any one of one or more embodiments and modifications, or an embodiment in which the extracted part is added to any of one or more embodiments and modifications described above.

Furthermore, in one or more embodiments described above, a case has been described in which the image formation apparatus 1 as an image formation apparatus is configured to include the image formation section 70 as an image formation section, the entire area printing rate calculator 72 as an entire area printing rate calculator, the divided area printing rate calculator 74 as a divided area printing rate calculator, and the deteriorated toner discard execution section 76 as a deteriorated developer discard execution section. The invention is not limited to thereto. For example, an image formation apparatus may be configured to include an image formation section, an entire area printing rate calculator, a divided area printing rate calculator, and a deteriorated developer discarding operation execution section that have configurations different from the configurations described above.

The invention can be used in printers that discard a deteriorated developer.

The invention includes other embodiments or modifications in addition to one or more embodiments and modifications described above without departing from the spirit of the invention. The one or more embodiments and modifications described above are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An image formation apparatus comprising:

an image formation section configured to form an image with a developer;

an entire area printing rate calculator configured to calculate an entire area printing rate, which is, a printing rate of an entirety of an image formation area;

a divided area printing rate calculator configured to calculate each divided area printing rate, which is, a printing rate of each of divided areas into which the image formation area is divided in a main scanning direction; and a deteriorated developer discarding operation execution section configured, when the entire area printing rate is equal to or lower than an entire area printing rate threshold, to perform a deteriorated developer discarding operation to discard the developer in any one of the divided areas in which the divided area printing rate is equal to or lower than a divided area printing rate threshold thereof.

2. The image formation apparatus according to claim 1, wherein the deteriorated developer discarding operation execution section is configured to perform the deteriorated developer discarding operation to discard the developer more in an amount in a first divided area of the divided areas that is provided at a position where a deteriorated developer tends to accumulate than in a second divided area of the divided areas that is provided at a position where the deteriorated developer tends to accumulate less than the first divided area.

3. The image formation apparatus according to claim 1, wherein the deteriorated developer discarding operation execution section is configured to perform the deteriorated developer discarding operation to discard the developer more in an amount in a first divided area of the divided areas that is located in an end portion of the image formation area in the main scanning direction than a second divided area of the divided areas that is located in a center portion of the image formation area in the main scanning direction.

4. The image formation apparatus according to claim 3, wherein the deteriorated developer discarding operation execution section is configured to perform the deteriorated developer discarding operation to discard the developer such that an amount of the discarded developer gradually increases from the second divided area that is located in the center portion of the image formation area in the main scanning direction to the first divided area that is located in the end portion of the image formation area in the main scanning direction.

5. The image formation apparatus according to claim 4, wherein the entire area printing rate calculator is configured to calculate an entire area developer discard count such that a smaller value is added to the entire area developer discard count as the entire area printing rate increases, the divided area printing rate calculator is configured to calculate a divided area developer discard count such that a smaller value is added to the divided area developer discard count as the divided area printing rate increases, whereas a larger value is added to the divided area developer discard count as a divided area developer discard threshold increases, and the deteriorated developer discarding operation execution section is configured to set a value of the divided area developer discard threshold to gradually increase from the second divided area that is located in the center portion of the image formation area in the main scanning direction to the first divided area that is located in the end portion of the image formation area in the main scanning direction, and the deteriorated developer discarding operation execution section is configured, when the entire area developer discard count is equal to or greater than an entire area threshold, to perform the deteriorated developer discarding operation in the divided area in which the divided area developer discard count is equal to or greater than a divided area threshold thereof.

6. The image formation apparatus according to claim 1, wherein the deteriorated developer discarding operation execution section is configured, even when the entire area printing rate is equal to or lower than the entire area printing rate threshold, not to perform the deteriorated developer discarding operation in the divided area in which the divided area printing rate is greater than the divided area printing rate threshold thereof.

7. The image formation apparatus according to claim 1, wherein the deteriorated developer discarding operation execution section is configured, when the entire area printing rate is greater than the entire area printing rate threshold, not to perform the deteriorated developer discarding operation in the divided area in which the divided area printing rate is equal to or lower than the divided area printing rate threshold thereof.

8. The image formation apparatus according to claim 1, wherein the entire area printing rate calculator is configured to calculate, based on a total number of dot counts of the divided areas and the number of rotations of an image carrier of the image formation section, the entire area printing rate, and the divided area printing rate calculator is configured to calculate, based on the dot count in each of the divided areas and the number of rotations of the image carrier, the divided area printing rate for each of the divided areas.

9. The image formation apparatus according to claim 1, wherein the deteriorated developer discarding operation execution section is configured to perform the deteriorated developer discarding operation by controlling the image formation section to discard the developer to an image carrier of the image formation section.

10. The image formation apparatus according to claim 1, wherein the entire area printing rate calculator is configured to calculate an entire area developer discard count such that a first value is added to the entire area developer discard count when the entire area printing rate is a first entire area printing rate and a second value that is smaller than the first value is added to the entire area developer discard count when the entire area printing rate is a second entire area printing rate that is greater than the first entire area printing rate.

11. The image formation apparatus according to claim 10, wherein the divided area printing rate calculator is configured to calculate a divided area developer discard count such that a third value is added to the divided area developer discard count when the divided area printing rate is a first divided area printing rate and a fourth value that is smaller than the third value is added to the divided area developer discard count when the divided area printing rate is a second divided area printing rate that is greater than the first divided area printing rate.

12. The image formation apparatus according to claim 11, wherein the divided areas include a first divided area of the divided areas in the main scanning direction and a second divided area located on a side of an end portion of the image formation area in the main scanning direction with respect to the first divided area, and the deteriorated developer discarding operation execution section is configured to set a divided area developer discard threshold such that the divided area developer discard threshold in the second divided area is greater than the divided area developer discard threshold in the first divided area.

13. The image formation apparatus according to claim 12, wherein the deteriorated developer discarding operation execution section is configured, when the entire area developer discard count is equal to or greater than an entire area threshold, to perform the deteriorated developer discarding operation in the divided area in which the divided area developer discard count is equal to or greater than a divided area threshold thereof.

* * * * *